United States Patent
Han et al.

(10) Patent No.: US 12,323,310 B2
(45) Date of Patent: Jun. 3, 2025

(54) METHOD AND APPARATUS FOR MANAGING RESOURCE THROUGH SERVICE DEMAND INFORMATION ANALYSIS IN WIRELESS COMMUNICATION SYSTEM

(71) Applicant: Samsung Electronics Co., Ltd., Suwon-si (KR)

(72) Inventors: Yoonseon Han, Suwon-si (KR); Sunghoon Kim, Suwon-si (KR); Jungshin Park, Suwon-si (KR); Jicheol Lee, Suwon-si (KR); Sangsoo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/796,777

(22) PCT Filed: Feb. 2, 2021

(86) PCT No.: PCT/KR2021/001375
§ 371 (c)(1),
(2) Date: Aug. 1, 2022

(87) PCT Pub. No.: WO2021/158001
PCT Pub. Date: Aug. 12, 2021

(65) Prior Publication Data
US 2023/0077340 A1 Mar. 16, 2023

(30) Foreign Application Priority Data
Feb. 4, 2020 (KR) .................. 10-2020-0013227

(51) Int. Cl.
*H04L 41/5051* (2022.01)
*H04L 41/0897* (2022.01)
(Continued)

(52) U.S. Cl.
CPC ...... *H04L 41/5051* (2013.01); *H04L 41/0897* (2022.05); *H04L 43/06* (2013.01);
(Continued)

(58) Field of Classification Search
CPC ......... H04L 43/06; H04L 67/51; H04L 43/55; H04L 41/147; H04L 41/5051; H04L 65/40
See application file for complete search history.

(56) References Cited

U.S. PATENT DOCUMENTS 10,911,326 B2    2/2021  Han et al.
11,206,541 B2   12/2021  Wang
(Continued)

FOREIGN PATENT DOCUMENTS

CN    110062375 A     7/2019
CN    110351229 A    10/2019
(Continued)

OTHER PUBLICATIONS

Dao, Ngoc Dung. "Support Web Services in a Mobile Edge Computing Services Network" specification, Apr. 12, 2019, U.S. Appl. No. 62/833,526 for US Patent Publication 2020/0329008, 66 pages. (Year: 2019).*
(Continued)

*Primary Examiner* — Nicholas R Taylor
*Assistant Examiner* — Angela Widhalm De Rodriguez
(74) *Attorney, Agent, or Firm* — Jefferson IP Law, LLP

(57) ABSTRACT

The present disclosure relates to a 5th generation (5G) or pre-5G communication system for supporting a higher data transmission rate than that of a beyond-4th generation (4G) communication system such as Long-Term Evolution (LTE). According to the present disclosure, a method for operating a network data analytics function (NWDAF) in a wireless communication system comprises the steps of receiving
(Continued)

information used for service analysis, receiving service analysis request information related to service use in order to perform the service analysis, generating service analysis information including service prediction information on the basis of the service analysis request information, and transmitting the service analysis information.

6 Claims, 11 Drawing Sheets

(51) Int. Cl.
    *H04L 41/147*      (2022.01)
    *H04L 43/06*      (2022.01)
    *H04L 43/55*      (2022.01)
    *H04L 65/40*      (2022.01)
    *H04L 67/51*      (2022.01)

(52) U.S. Cl.
    CPC .............. *H04L 43/55* (2022.05); *H04L 65/40* (2013.01); *H04L 67/51* (2022.05); *H04L 41/147* (2013.01)

(56) References Cited

U.S. PATENT DOCUMENTS

| | | | |
|---|---|---|---|
| 11,849,331 | B2 | 12/2023 | Lee et al. |
| 2018/0262924 | A1* | 9/2018 | Dao ................... H04W 72/535 |
| 2019/0357301 | A1* | 11/2019 | Li ........................ H04W 80/10 |
| 2020/0252813 | A1* | 8/2020 | Li ........................ G06Q 20/4016 |
| 2020/0329008 | A1* | 10/2020 | Dao ...................... G06F 16/953 |
| 2021/0021494 | A1* | 1/2021 | Yao ...................... H04L 41/147 |
| 2021/0092609 | A1* | 3/2021 | Wang ..................... H04L 63/14 |
| 2021/0168584 | A1* | 6/2021 | Li ........................ H04W 60/00 |
| 2021/0352564 | A1 | 11/2021 | Han et al. |
| 2021/0377720 | A1 | 12/2021 | Wang |

FOREIGN PATENT DOCUMENTS

| | | | |
|---|---|---|---|
| KR | 10-2019-0116894 A | 10/2019 | |
| KR | 10-2019-0132898 A | 11/2019 | |
| KR | 10-2020-0002615 A | 1/2020 | |
| KR | 10-2020-0039529 A | 4/2020 | |
| WO | 2019/158737 A1 | 8/2019 | |
| WO | WO-2019197467 A1 * | 10/2019 | .............. H04L 41/14 |
| WO | WO-2020239195 A1 * | 12/2020 | .......... H04L 41/5051 |
| WO | WO-2021136600 A1 * | 7/2021 | ........... H04L 41/082 |

OTHER PUBLICATIONS

3GPP, "3GPP TS 23.288 V16.1.0", Sep. 2019, 3GPP Organizational Partners, pp. 20-48. (Year: 2019).*

ZTE, [draft] Reply LS on RAN related parameters collected from UE, 3GPP TSG RAN WG3 NR#103, R3-190277, Feb. 15, 2019, Athens, Greece.

Korean Office Action dated Jan. 21, 2025, issued in Korean Patent Application No. 10-2020-0013227.

* cited by examiner

METHOD AND APPARATUS FOR MANAGING RESOURCE THROUGH SERVICE DEMAND INFORMATION ANALYSIS IN WIRELESS COMMUNICATION SYSTEM

TECHNICAL FIELD

The disclosure generally relates to a wireless communication system, and more particularly, to an apparatus and a method for managing resources by analyzing demand information of a specific service and providing analyzed information to a service provider in a wireless communication system.

BACKGROUND ART

Efforts to develop enhanced $5^{th}$ generation (5G) communication systems or pre-5G communication systems have been ongoing in order to meet the increasing demand for wireless data traffic since $4^{th}$ generation (4G) communication systems were commercialized. For this reason, the 5G communication systems or pre-5G communication systems are called Beyond 4G network communication systems or post long term evolution (LTE) systems.

The 5G communication system is considered to be implemented in a superhigh frequency (mmWave) band (for example, 60 GHz band) to achieve a high data transmission rate. For the 5G communication systems, technologies for beamforming, massive multiple input multiple output (MIMO), full dimensional MIMO (FD-MIMO), array antenna, analog beam-forming, and large scale antenna are being discussed to mitigate a path loss of a radio wave and to increase a transmission distance of a radio wave in a superhigh frequency band.

In addition, technologies for evolved small cells, advanced small cells, cloud ratio access network (RAN), ultra-dense network, device to device communication (D2D), wireless backhaul, moving network, cooperative communication, coordinated multi-points (CoMP), and interference cancellation in the 5G communication systems are developing to enhance networks of systems. In addition, hybrid frequency shift keying and quadrature amplitude modulation (FQAM) and sliding window superposition coding (SWSC), which are advanced coding modulation (ACM) schemes, and filter bank multi carrier (FBMC), non-orthogonal multiple access (NOMA), and sparse code multiple access (SCMA) which are enhanced accessing technology in 5G systems are developing.

The Internet is evolving from a person-centered connection network where persons generate and consume information into an Internet of things (IoT) network where information is exchanged and processed between distributed components such as things. In addition, Internet of everything (IoE) technology which combines big data processing technology and IoT technology through connection with a cloud server, etc. is gaining prominence. Implementation of IoT requires technique elements as sensing technology, wired and wireless communication and network infrastructure, service interface technology, and security technology, and researches on a sensor network, machine to machine (M2M), machine type communication (MTC) for connecting between things are being conducted. An intelligent Internet technology (IT) service may be provided to create new values in people's lives, by collecting, analyzing data generated in things connected in an IoT environment. IoT may be applied to various fields, such as smart home, smart building, smart city, smart car or connected car, smart grid, health care, smart home appliance, high-tech medical service, etc., with convergence and combination of existing IT between various industries.

To this end, various attempts to apply a 5G communication system to an IoT network are being made. 5G communication of sensor network, machine to machine (M2M), machine type communication (MTC), etc. may be implemented by techniques of beamforming, MIMO, and array antenna, etc. As an example of convergence of 5G technology and IoT technology, a cloud radio access network (RAN) may be applied to big data processing technology.

In a computing implementation structure utilizing wireless communication, mobile edge computing, which is technology for combining wireless communication and cloud computing or positioning a server near to a user who wishes to use a communication service and processing user's data, is utilized. Herein, communication performs a passage function for delivering information, and performs application-based computing.

On the other hand, a network data analytics function (NWDAF) is one of network functions of a 5G core network control plane, and provides a function of collecting and analyzing network data. Specifically, the NWDAF assists in optimizing each network function and enhancing performance by analyzing data through intelligence technology such as machine learning based on collected network data, and providing a value resulting from analysis to other 5G core network functions. There may be various problems occurring when network analysis information provided by the NWDAF is delivered, and researches for solving these problems are actively proceeding.

DISCLOSURE OF INVENTION

Technical Problem

Based on the above-described discussion, the disclosure provides an apparatus and a method for providing analysis information regarding a service demand generated in a mobile communication network in a wireless communication system.

In addition, the disclosure provides an apparatus and a method whereby a network data analytics function (NWDAF) provides expected service usage information to a mobile edge computing (MEC) by applications in a wireless communication system.

In addition, the disclosure provides an apparatus and a method whereby an NWDAF provides expected service usage information to a service provider in a wireless communication system.

In addition, the disclosure provides an apparatus and a method for managing service resources by forecasting a service demand in a wireless communication system.

In addition, the disclosure provides an apparatus and a method for supporting service data migration by forecasting a service resource demand in a wireless communication system.

Solution to Problem

According to various embodiments of the disclosure, there is provided an operating method of a network data analytics function (NWDAF) in a wireless communication system, the method including receiving information used for a service analysis, receiving service analysis request information related to use of a service, for the sake of the service analysis, generating service analysis information including expected service information, based on the service analysis request information, and transmitting the service analysis information.

According to various embodiments of the disclosure, there is provided an NWDAF in a wireless communication system, the NWDAF including at least one transceiver and at least one processor functionally coupled to the at least one transceiver, wherein the at least one processor is configured to control to receive information used for a service analysis, receive service analysis request information related to use of a service, for the sake of the service analysis, generate service analysis information including expected service information, based on the service analysis request information, and transmit the service analysis information.

According to various embodiments of the disclosure, there is provided an operating method of a service provider in a wireless communication system, the method including transmitting information used for a service analysis, transmitting service analysis request information related to use of a service, for the sake of the service analysis, and receiving service analysis information generated according to the service analysis request information.

According to various embodiments of the disclosure, there is provided a service provider in a wireless communication system, the service provider including at least one transceiver and at least one processor functionally coupled to the at least one transceiver, wherein the at least one processor is configured to control to transmit information used for a service analysis, transmit service analysis request information related to use of a service, for the sake of the service analysis, and receive service analysis information generated according to the service analysis request information.

Advantageous Effects of Invention

The apparatus and the method according to various embodiments of the disclosure provide technology for managing optimized resources by analyzing and forecasting a service demand.

The effect achieved in the disclosure is not limited to those mentioned above, and other effects that are not mentioned above may be clearly understood to those skilled in the art based on the description provided below.

BEST MODE FOR CARRYING OUT THE INVENTION

Figure 1:
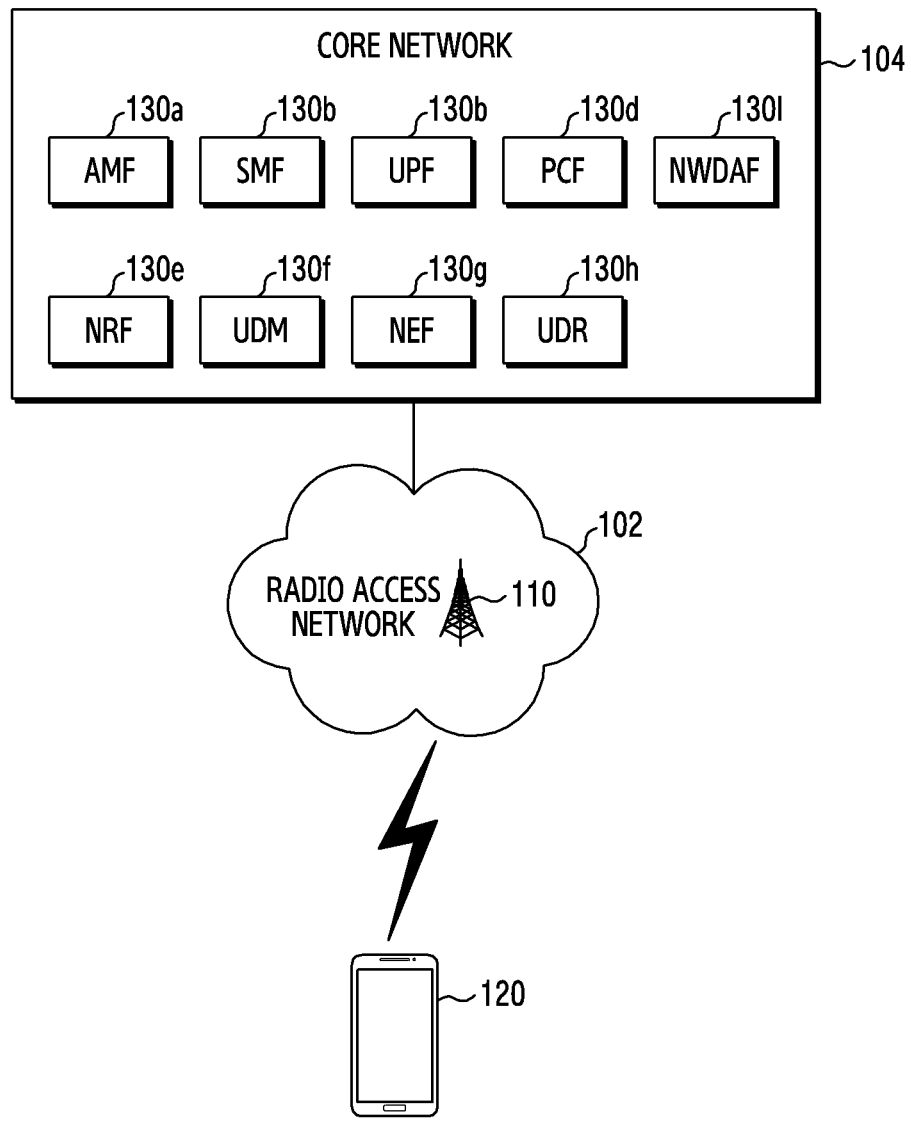
FIG. 1 is a view illustrating a wireless communication system according to various embodiments of the disclosure.

Terms used in the disclosure are used to describe specified embodiments and are not intended to limit the scope of other embodiments. The terms of a singular form may include plural forms unless otherwise specified. All of the terms used herein, which include technical or scientific terms, may have the same meaning that is generally understood by a person skilled in the art. It will be further understood that terms, which are defined in a dictionary, may be interpreted as having the same or similar meanings as or to contextual meanings of the relevant related art and not in an idealized or overly formal way, unless expressly so defined herein in the disclosure. In some cases, even if the terms are terms which are defined in the specification, they should not be interpreted as excluding embodiments of the present disclosure.

In various embodiments of the disclosure described below, hardware-wise approach methods will be described by way of an example. However, various embodiments of the disclosure include technology using both hardware and software, and thus do not exclude software-based approach methods.

Each block of the process flowcharts described hereinbelow and combinations of the flowcharts may be performed by computer program instructions. Since computer program instructions may be loaded into a processor of a generic-purpose computer, a special computer, or other programmable data processing equipment, the instructions performed by the processor of the computer or other programmable data processing equipment may generate a means for performing functions explained in the blocks of the flowcharts. Since computer program instructions may be stored in a computer usable or computer readable memory which is directed at a computer or other programmable data processing equipment in order to implement a function in a specific method, the instructions stored in the computer usable or computer readable memory may produce a manufacturing item including an instruction means for performing functions explained in the blocks of the flowcharts. Since computer program instructions may be loaded on a computer or other programmable data processing equipment, a series of operation steps may be performed on the computer or other programmable data processing equipment to generate a process to be executed by the computer, and the instructions performing the computer or other programmable data processing equipment may provide steps for executing functions explained in the blocks of the flowcharts.

In addition, each block may indicate a part of a module, a segment or a code including one or more executable instructions for executing a specified logical function. In some alternative examples, a function mentioned in a block may be generated irrespective of an order. For example, two blocks which are successively illustrated may be performed substantially at the same time or may be performed in the inverse order according to their corresponding functions.

The term "unit" used in the present embodiments refers to a software component or a hardware component such as a field programmable gate array (FPGA) or an application specific integrated circuit (ASIC), and the "unit" performs a certain role. However, the "unit" is not limited to software or hardware, The "unit" may be configured to exist in a storage medium which may address, and may be configured to reproduce one or more processors. Accordingly, for example, the "unit" may include components such as software components, object-oriented software components, class components and task components, and processes, functions, attributes, procedures, sub-routines, segments of a program code, drivers, firmware, microcode, circuit, data, database, data structures, tables, arrays, and variables. Functions provided in the components and the "units" may be coupled with fewer components and "units" or may further be divided into additional components and "units." In addition, the components and the "units" may be implemented to reproduce one or more CPUs in a device or a security multimedia card. In addition, in an embodiment, the "unit" may include one or more processors.

In explaining embodiments of the disclosure in detail, the disclosure mainly aims at a packet core (5G system or 5G core network or next generation (NG) core) which is a radio access network (new RAN (NR)) and a core network on 5G mobile communication standards specified by $3^{rd}$ generation partnership project long term evolution (3GPP), which is a mobile communication standardization group. However, the main features of the disclosure are applicable to other communication systems having similar technical backgrounds through minor changes without departing from the scope of the disclosure, and this may be determined by those skilled in the art.

For convenience of explanation, some of the terms and the names defined in 3GPP standards (5G, NR, LTE, or standards of systems similar thereto) may be used. However, the disclosure is not limited by the terms and the names, and may be equally applied to systems conforming to other standards.

As used herein, terms for identifying an access node, terms indicating network entities, terms indicating messages, terms indicating an interface between network entities, terms indicating a variety of identification information are merely examples for convenience of explanation. Accordingly, the disclosure is not limited to the terms described below, and other terms indicating objects having the same technical meanings may be used.

The disclosure may be applied to an intelligent service which is based on 5G communication technology and IoT-related technology (for example, smart home, smart building, smart city, smart car or connected car, health care, digital education, retail business, security and safety-related service, etc.).

The disclosure discloses a method for delivering information related to utilization of a specific service provided from an outside of a network in a mobile communication system, by collecting, analyzing, and predicting network information. By utilizing such analysis information, a service provider may pre-allocate necessary optimal resources in order to smoothly provide a service, thereby enhancing efficiency of resource utilization. In addition, a system according to the disclosure may be pre-allocated resources by utilizing service analysis information considering mobility of a terminal, or may transfer information necessary for providing a service to a server positioned at a specific position, or may duplicate the information, so that a service delay time may be reduced and overall service quality may be enhanced.

The disclosure relates to providing service-related analysis information in a network data analytic function (NWDAF). Specifically, the disclosure describes technology for expanding a function of a network data analytic function (NWDAF), analyzing and predicting mobility of a terminal and a demand for a specific service or traffic, and delivering to an edge computing positioned outside or an entity which manages resources of the edge computing.

In this case, it is assumed that the entity positioned outside is an edge computing, but the same method may be provided in operating not only the edge computing but also a server running in a place of a specific network, or services.

As used herein, terms indicating signals, terms indicating channels, terms indicating control information, terms indicating network entities, terms indicating components of an apparatus are merely examples for convenience of explanation. Accordingly, the disclosure is not limited to the terms described below, and other terms having the same technical meanings may be used.

In addition, the disclosure describes various embodiments by using terms used in some communication standards (for example, $3^{rd}$ generation partnership project (3GPP)), but these embodiments are merely examples. Various embodiments of the disclosure may be easily modified and applied to other communication systems.

According to various embodiments of the disclosure, there is provided a method for using analysis information regarding a service demand generated in a mobile communication network, and prospective demand information in order to automate management of resources of an edge computing infrastructure connected with a core network of mobile communication. The edge computing is positioned at a short distance from a position of a user, and provides a service of higher quality than a service provided by related-art concentrated cloud computing. A service demand generated in a mobile communication network may dynamically change according to a time and a place due to mobility characteristics of a terminal, and the disclosure describes a method related to an automation technique for supporting effective management of resources, by supporting an edge computing optimized for a service demand or a resource demand dynamically changing.

A system according to the disclosure illustrates a method of analyzing and forecasting mobility of a terminal and a service demand in a mobile communication network, and providing to an edge computing. Resources of the edge computing may refer to a concept including all of physical/logical resources for providing a hosted service.

If a service request made in a mobile communication network is not transmitted to concentrated Internet or a data center and is directly connected to a service provided in an edge computing, a wireless communication system may have advantages of a low delay time, a high processing speed, and reduction of a a load of a center cloud. A service provider may forecast a service demand generated in a specific edge computing resource and may manage optimal resources in case unused resources are generated or resources are not pre-allocated due to mobility of a terminal and the existing advantages are not provided. The disclosure describes a method whereby a network data analytics function (NWDAF), which is an entity forming a core network, analyzes mobility of a terminal and a communication pattern, analyzes and forecasts a demand for a service made for a specific service or a specific data network, and provides to an edge computing. The disclosure provides a method of assisting in automating operations of provisioning resources in advance, collecting unused resources when managing edge computing resources, or determining for resource management.

A method according to various embodiments of the disclosure includes a method of analyzing and forecasting a service demand for an edge computing by considering mobility of a terminal and a service using pattern, and providing. Through this, the edge computing supports a method of collecting unused resources or allocating optimal resources according to the service demand. A mobile communication system according to the disclosure provides a method of enhancing service quality by provisioning resources of an edge computing in advance according to generation of a service demand, a change in the demand like increase or reduction. Through resource optimization, efficiency of resource management of the edge computing may be enhanced, and an effect of saving a management cost may be obtained by applying automation.

FIG. 1 illustrates a wireless communication system according to various embodiments of the disclosure.

Referring to FIG. 1, the wireless communication system includes a radio access network (RAN) 102 and a core network (CN) 104.

The radio access network 102 is a network that is directly connected with a user device, for example, a terminal 120, and is an infrastructure that provides a radio access to the terminal 120. The radio access network 102 may include a collection of a plurality of base stations including a base station 110, and the plurality of base stations may perform communication through an interface formed therebetween. At least part of the interfaces between the plurality of base stations may be a wired interface or a wireless interface. The base station 110 may have a structure that is divided into a central unit (CU) and a distributed unit (DU). In this case, one CU may control a plurality of DUs. The base station 110 may be referred to as "access point (AP)," "next generation node B (gNB)," "5$^{th}$ generation (5G) node," "wireless point," "transmission/reception point (TRP)," or other terms having the same technical meaning as the above-mentioned terms, in addition to the base station. The terminal 120 accesses the radio access network 102 and performs communication with the base station 110 through a wireless channel. The terminal 120 may be referred to as "user equipment (UE)," "customer premises equipment (CPE)," "mobile station," "subscriber station," "remote terminal," "wireless terminal," or "user device" or other terms having the same technical meaning as the above-mentioned terms, in addition to the terminal.

The core network 104 is a network for managing the whole system, and may control the radio access network 102 and may process data and control signals regarding the terminal 120 which are transmitted and received through the radio access network 102. The core network 104 may perform various functions, such as controlling a user plane and a control plane, processing mobility, managing subscriber information, charging, interworking with other types of systems (for example, a long term evolution (LTE) system). In order to perform the above-described various functions, the core network 104 may include a plurality of entities which are functionally divided and have different network functions (NFs). For example, the core network 104 may include an access and mobility management function (AMF) 130a, a session management function (SMF) 130b, a user plane function (UPF) 130c, a policy and charging function (PCF) 130d, a network repository function (NRF) 130e, a user data management (UDM) 130f, a network exposure function (NEF) 130g, a unified data repository (UDR) 130h, a network data analytics function (NWDAF).

The terminal 120 may be connected with the radio access network 102 to access the AMF 130a of the core network 104, which performs a mobility management function. The AMF 130a is a function or a device that is responsible for both access by the radio access network 102 and mobility management of the terminal 120. The SFM 130b is an NF that manages a session. The AMF 130a is connected with the SMF 130b, and the AMF 130a routes a session-related message regarding the terminal 120 to the SMF 130b. The SMF 130b is connected with the UPF 130c, and allocates a user plane resource to provide to the terminal 120, and establish a tunnel for transmitting data between the base station 110 and the UPF 130c. The PCF 130d controls information related to a policy and charging regarding a session used by the terminal 120. The NRF 130e performs functions of storing information regarding NFs installed in a mobile communication operator network, and of informing stored information. The NRF 130e may be connected with all NFs. Each of the NFs is registered at the NRF 130e when an operation starts in an operator network, thereby informing the NRF 130e that a corresponding NF is driven within the network. The UDM 130f is an NF that performs a similar role to that of a home subscriber server (HSS) of a 4G network, and stores subscription information of the terminal 120 or a context that is used by the terminal 120 in the network.

The NEF 130g performs a role of connecting a 3$^{rd}$ party server and an NF in a 5G mobile communication system. In addition, the NEF 130g performs a role of providing data to the UDR 130h, or updating or acquiring data. The UDR 130h performs a function of storing subscription information of the terminal 120, storing policy information, storing data exposed to the outside, or storing information necessary for a 3$^{rd}$ partyapplication. In addition, the UDR 130h performs a role of providing stored data to another NF.

The NWDAF 130l analyzes information collected from the network or an outside and provides the information to an NF. The NWDAF 130l may collect information from operation, administration, and maintenance (OAM), an NF configuring a 5G network, or an application function (AF). The NWDAF 130l may collect information in various methods. A representative analysis function of the NWDAF 130l may be collecting and analyzing a load level of a network slice instance and providing for a network slice selection function (NSSF) to use in selecting a specific terminal. In this case, when analysis information is requested between a specific NF and the NWDAF or an analysis result value is transmitted, a service-based interface which is defined in the 5G network may be used.

The NWDAF 130l may provide an analysis information subscription service (Nnwdaf_analyticssubscription service). The analysis information subscription service is to subscribe to and unsubscribe from an event generated at the NWDAF, and may be subdivided into a method of receiving an event periodically or receiving an event if a specific condition is satisfied. The analysis information subscription service may be referred to as Nnwdaf_analyticssubscription. Nnwdaf_analyticssubscription provide three operations of subscribing, unsubscribing, notifying.

When a specific NF wants subscription (Nnwdaf_analyticssubscription), parameters that the specific NF transmits to the NWDAF may be divided into an "input required" parameter and an "inputs, optional" parameter. According to an embodiment of the disclosure, the "input required" may include single network slice selection assistance information (S-NSSAI), an event identifier, a notification target address, event reporting information. In addition, according to an embodiment of the disclosure, the "input, optional" may include information additionally required for processing analysis information. In addition, the "input, optional" may include event filter information.

When the NF wants unsubscription (Nnwdaf_analyticssubscription_unsubscribe), the NF transmits subscription identifier information to the NWDAF through "inputs required," and the NWDAF 130*l* transmits a full text indicating that unsubscription is identified to the NF which requested the operation as an output.

A subscription notification operation (Nnwdaf_analyticssubscription_notify) is notifying, by the NWDAF 103*l*, a specific event to the NF successfully subscribing to an event periodically or when a specific condition is satisfied. "Inputs required" information of the notifying operation may include an event identifier, a notification target address, an identifier of network slice instance, load level information of network slice instance, and "inputs, optional" information may not be provided.

The NWDAF 130*l* may provide an analysis information request service (Nnwdaf_AnalyticsInfo service). The analysis information request service may refer to a service of receiving a result value immediately when the NF requests analysis of specific information and the request is completed. An operation supported in the analysis information request service may include a request and a response. The NF which requests analysis information may send an analysis information request to the NWDAF.

The NF transmits, to the NWDAF, load level information of network slice instance, analytic ID, and additional parameters necessary for analysis, through "inputs required." When the NWDAF 130*l* receives the request for analysis information from the NE, the NWDAF 130*l* transmits a result of analysis to the NF as a response. The NWDAF 130*l* transmits load information of the slice in response to the request.

In the disclosure, information provided by the NWDAF is not limited only to load information, and may include movement information of a terminal, a communication pattern of a terminal/service, an expected moving trajectory of a terminal service, an expected UE behavioral parameter, expected quality of service (QoS), service experience, prospective network performance information, etc. According to an embodiment of the disclosure, the information provided by the NWDAF may include analysis information related to a service, which is positioned outside or inside a mobile communication network, in addition to analysis information. The service-related analysis information may be based on an analysis value or an expected value of a specific time, and types of information may include the number of terminals using a service, the number of QoS flows, the number of packet data unit (PDU) sessions, a traffic volume, the number of packets, expected QoS level classified by service. Additionally, since the same service may be provided at different positions, simultaneously, in an edge computing environment, analysis information of the service may be used and provided along with an address used in a network, a position of a data network name (DNN) or DN access identifier (DNAI) connected with a core network, uniform resource locator (URL)/uniform resource identifier (URI), in addition to an identifier specifying the service. According to an embodiment of the disclosure, when a service A providing streaming is provided at a network address of 1.1.1.1, 1.1.2.1 and a network address of 2.2.2.2-2.2.2.10, the same service may be classified by position through a combination of (application ID=A, IP Address=1.1.1.1, 1.1.2.1), (application ID=A, IP Address=2.2.2.2-2.2.2.10), etc., and analysis information may be provided. The service providing streaming may complexly use a network address, a DNN or DNAI, URI/URL, etc.

Figure 2:
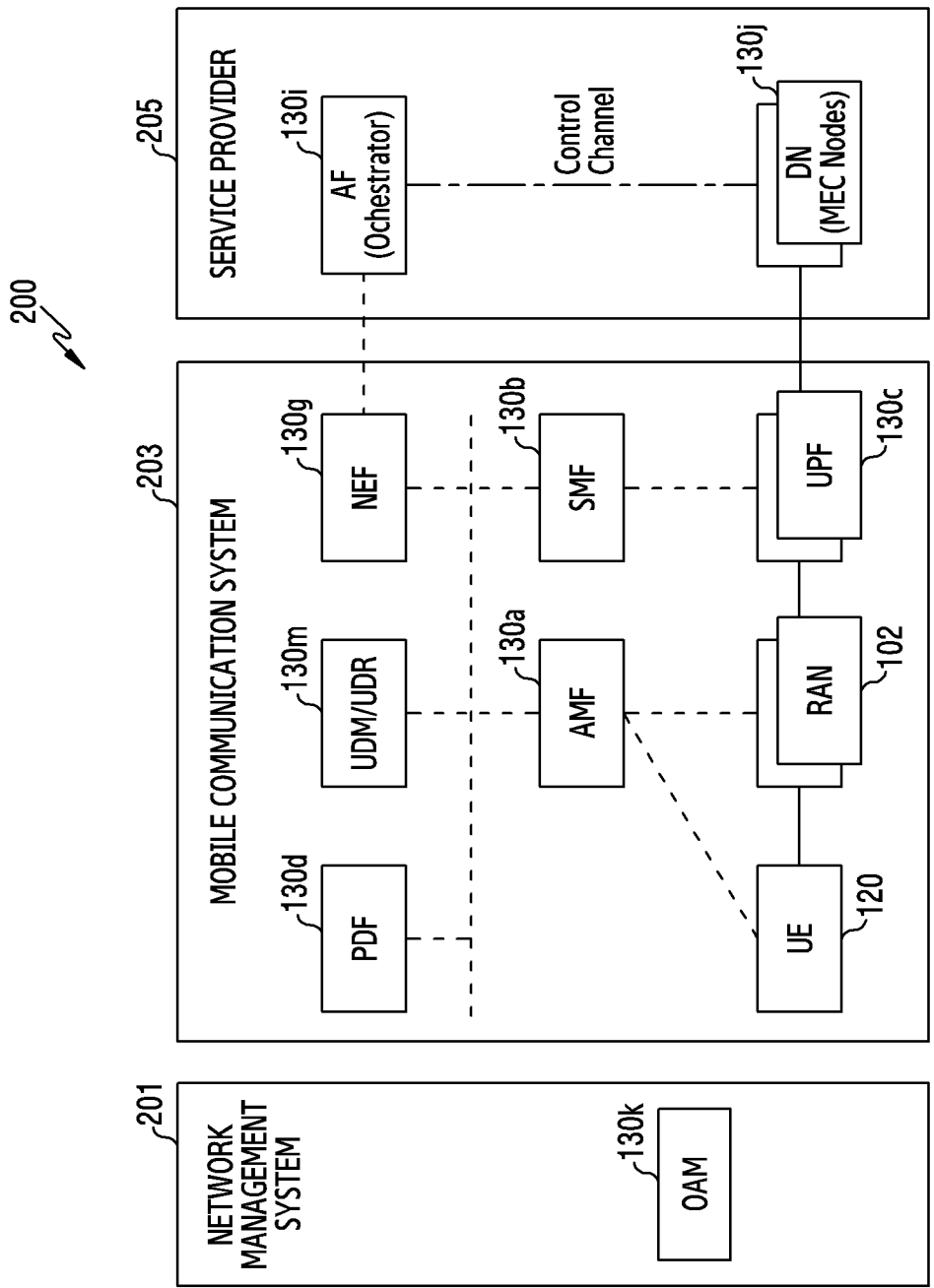
FIG. 2 is a view illustrating objects of a wireless communication system and a service provider according to various embodiments of the disclosure.

FIG. 2 illustrates objects of a mobile communication system and a service provider according to various embodiments of the disclosure.

A unit performing each of functions provided by a network system may be defined as a network function (NF). A network management system 201, a mobile communication system 203, and a service provider 205 are illustrated in FIG. 2. The mobile communication system 203 may include user equipment (UE) 120, a radio access network (RAN) 102, a UPF 130*c*, an AMF 130*a*, an SMF 130*b*, a PCF 130*d*, a UDM/UDR 130*m*, an NEF 130*g*, and the service provider 205 may include an application function (AF), and a data network (DN) through which user data is transmitted, such as the Internet, in order to communicate with the mobile communication system. The system 201 for managing a network may include operation, administration and maintenance (OAM) 130*k*, in addition to an NF. In addition, external objects for providing a service may include an edge computing infrastructure, an infrastructure manager, and a service. The edge computing infrastructure manager is an entity that performs a role of managing resources existing in the edge computing infrastructure, and may exist as an independent entity or may refer to an entity that exists on a specific service or a platform to perform the same function. It is assumed that the edge computing infrastructure manager according to the disclosure exchanges information with a network through the NEF 130*g*, and the edge computing infrastructure manager may be the same as an AF or may be connected with an AF to exchange information with a core network. Relationships among the entities are illustrated in FIG. 2. In FIG. 2, the OAM may not use a standardized interface and may perform communication with all entities of the mobile communication system in its own method. A system configuration of the service provider may vary by service, and may be divided into a node that performs a role of a server to really provide a service, and a management node for managing these servers such as a resource manager or an orchestrator. The nodes may not clearly be distinguished according to service, and may be logically classified.

Figure 3:
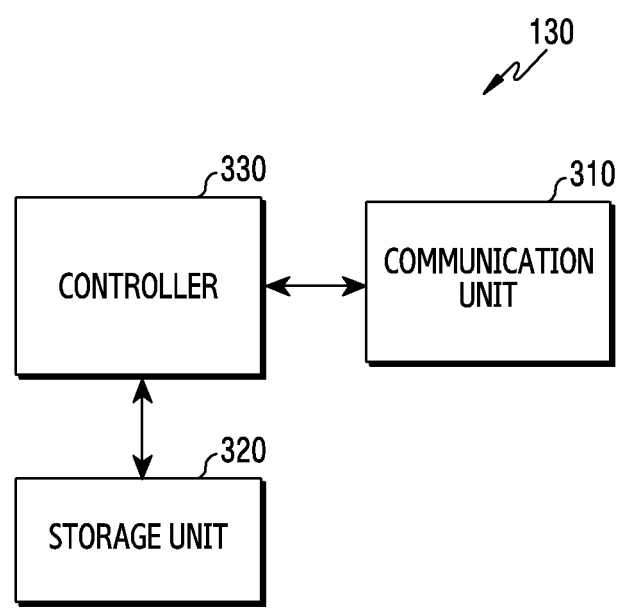
FIG. 3 is a view illustrating a configuration of a core network object in a wireless communication system according to various embodiments of the disclosure.

FIG. 3 illustrates a configuration of a core network object in a wireless communication system according to various embodiments of the disclosure. The configuration 130 illustrated in FIG. 4 may be understood as a configuration of a device having at least one function of 130*a*, 130*b*, 130*c*, 130*d*, 130*e*, 130*f*, 130*g*, 130*h*, 130*i*, 130*j*, 130*l*, 130*m* of FIG. 1. The term "unit" or terms ending with suffixes "-er," and "-or" used in the following descriptions refer to a unit processing at least one function or operation, and may be implemented by hardware, software, or a combination of hardware and software.

Referring to FIG. 3, the core network object may be configured by including a communication unit 310, a storage unit 320, and a controller 330.

The communication unit 310 provides an interface for performing communication with other devices in a network. The communication unit 310 may convert a bit stream transmitted from the core network object to another device into a physical signal, and may convert a physical signal received from another device into a bit stream. That is, the communication unit 310 may transmit and receive signals. Accordingly, the communication unit 310 may be referred to as a modem, a transmitter, a receiver, or a transceiver. In this case, the communication unit 310 may enable the core network object to communicate with other devices or a system through a backhaul (for example, wired backhaul or wireless backhaul) connection or a network.

The storage unit 320 stores data such as a basic program for operations of the core network object, an application program, configuration information, etc. The storage unit 320 may be configured by a volatile memory, a nonvolatile memory, or a combination of a volatile memory and a nonvolatile memory. In addition, the storage unit 320 provides stored data according to a request of the controller 330.

The controller 330 controls overall operations of the core network object. For example, the controller 330 transmits and receives signals through the communication unit 310. In addition, the controller 330 may write, read data on, from the storage unit 320. To achieve this, the controller 330 may include at least one processor. According to various embodiments, the controller 330 may control to analyze collected network data. The controller 330 may control to analyze data through intelligence technology such as machine learning, based on the collected network data. According to an embodiment of the disclosure, the controller 330 may perform statistical calculation or determine predicted change with respect to end-to-end service satisfaction, network function load, network performance, terminal-related information, user data congestion, information on change in quality of service (QoS). The controller 330 may control the core network object to perform operations according to various embodiments, which will be described below.

Figure 4:
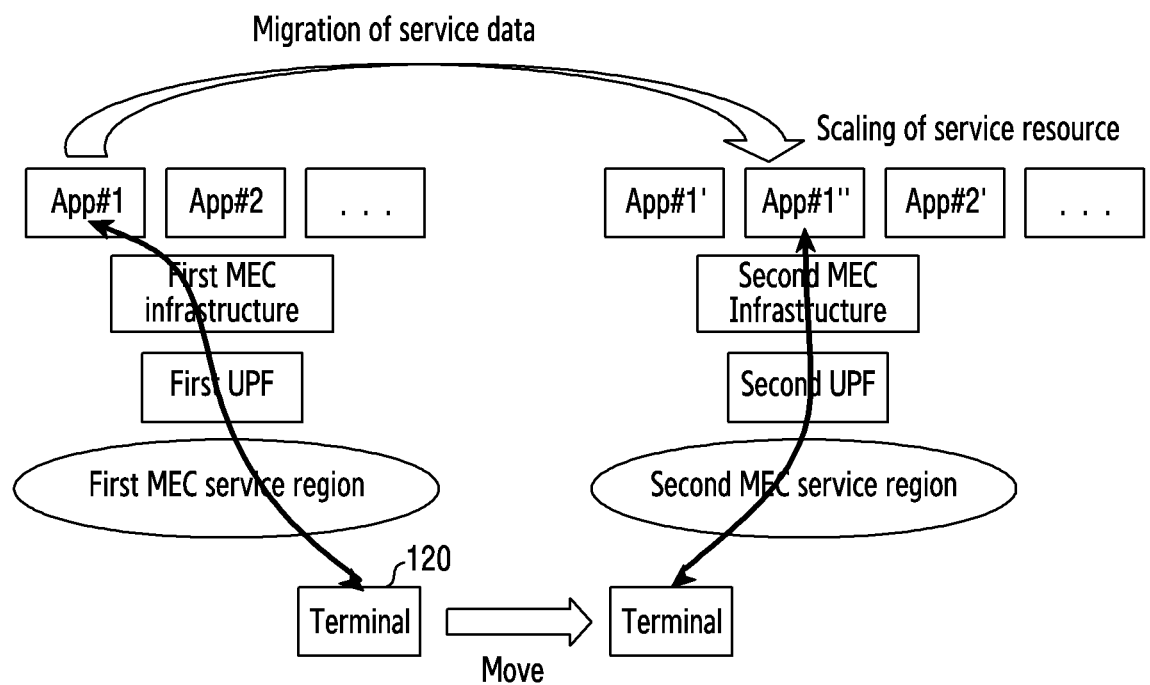
FIG. 4 is a view illustrating a process of managing service resources according to a movement of a terminal in a wireless communication system according to various embodiments of the disclosure.

FIG. 4 illustrates a process of managing service resources according to a movement of a terminal in a wireless communication system according to various embodiments of the disclosure.

Referring to FIG. 4, a terminal 120 in a first mobile edge computing (MEC) service region may access a network through a first MEC. In addition, a terminal in a second MEC service region may access the network through a second MEC. Referring to FIG. 4, a terminal may move from the first MEC service region to the second MEC service region. When the terminal in the first MED service region moves to the second MEC service region, service data within the first MEC region may be transmitted to a service provider within the second MEC region. According to an embodiment of the disclosure, an NWDAF 130*l* may provide expected usage information of a specific service to the service provider. According to an embodiment of the disclosure, the NWDAF 130*l* may provide expected usage information of a specific service within the first MEC service region to the service provider within the second MEC service region. The NWDAF provides the expected usage information of the specific service to the service provider, and accordingly, the service provider may receive relevant data through an MEC service provider. In addition, when service data is transferred, service resources may be managed through provisioning of service resources or scaling of service resources.

Figure 5:
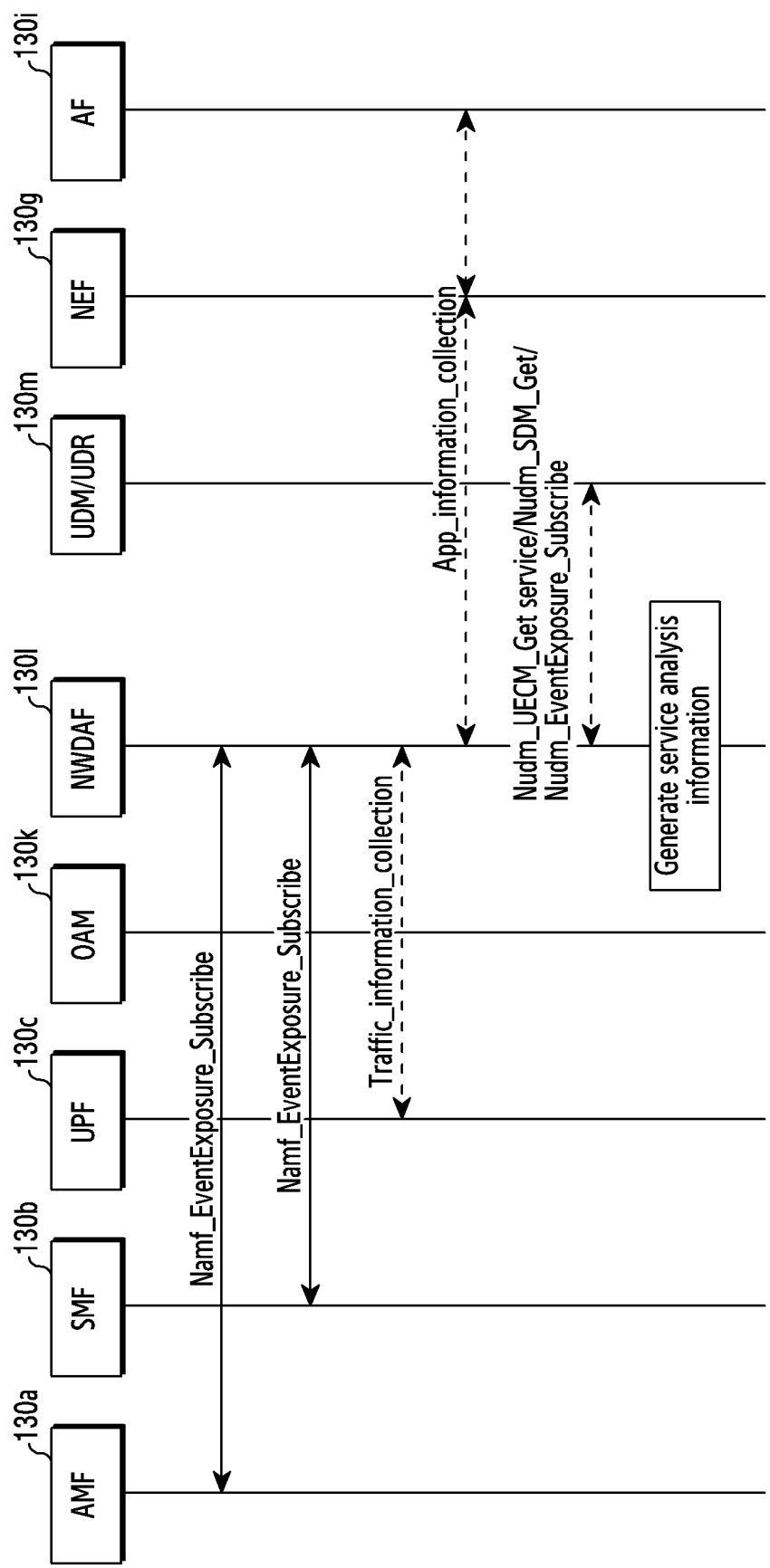
FIG. 5 is a view illustrating an example of data collection for use of service analysis information in a wireless communication system according to various embodiments of the disclosure.

FIG. 5 illustrates an example of data collection for use of service analysis information in a wireless communication system according to various embodiments of the disclosure.

An NWDAF 130*l* may receive data related to a service in order to provide service-related analysis information. The NWDAF 130*l* may receive an identifier to distinguish a specific service from other services. To distinguish traffic of the specific service, a collection of packets for the specific service may be referred to as a service flow, and may be expressed by a collection of packets or IP flows transmitted from a UPF 130*c*. In order to obtain a method for detecting a specific service flow from other data flows, the NWDAF 130*l* may receive a method for detecting a specific service by service, by utilizing the received identifier and filter information.

Information that the NWDAF 130*l* collects to distinguish the specific service from other services may include a service data flow (SDF) description, a policy and charging control (PCC) rule, a service parameter, an application identifier, a packet flow description (PFD), application data, a QoS rule, an AF request, a packet detection rule (PDR), a traffic report.

The NWDAF 130*l* may receive the SDF description from an AF 130*i*. The NWDAF 130*l* may receive the SDF description from a PCF 130*d*. The NWDAF 130*l* may receive the SDF description from an SMF 130*b*. The NWDAF 130*l* may receive the SDF description from an NEF 130*g*. The SDF description may include an SDF template, and each SDF template may be expressed by a collection of SDF filters. At least one filter in the collection of SDF filters may include filter information for detecting packets for a specific service in a UPF 130*c*. The filter information may include information in each uplink (UL)/downlink (DL) direction. A filter may include a filter for an IP flow and an Ethernet flow. The SDF template may include an application identifier. The SDF description may be transmitted from the AF 130*i* to the PCF 130*d*, or may be configured in the PCF according to an internal policy. The NWDAF 130*l* may collect an address of the specific service and an application identifier by collecting the SDF description transmitted from the AF 130*i* to the PCF 130*d*.

The NWDAF 130*l* may receive the PCC rule from the SMF 130*b*/PCF 130*d*. The PCC rule is a rule that is used for the PCF 130*d* to control a policy or charging regarding the SDF, to control a protocol data unit (PDU) session policy, or to report an event related to a PDU session. The PCC rule may be generated by the PCF 130*d* and may be transmitted to the SFM 130*b*, and information or an internal policy transmitted by the AF 130*i* may be utilized to generate the PCC rule. The PCC rule may include a variety of information regarding the policy and charging. The PCC rule may include a detection rule used on a data plane, and a policy and a control method applied to detected data. Through this, the NWDAF 130*l* may collect rules for detecting a specific service.

The NWDAF 130*l* may receive the service parameter from the AF 130*i*. The NWDAF 130*l* may receive the service parameter from the PCF 130*d*. The NWDAF 130*l* may receive the service parameter from UE 120. According to an embodiment of the disclosure, the AF 130*i* may transmit parameters regarding a specific service which is being performed in the UE 120 through the NEF 130*g*. In this process, the NWDAF 130*l* may collect an AF-service ID or an application ID, and information of a service provider.

The NWDAF 130*l* may receive the application identifier from the AF 130*i*. The NWDAF 130*l* may receive the application identifier from the PCF 130*d*. The NWDAF 130*l* may receive the application identifier from the SMF 130*b*. The NWDAF 130*l* may receive the application identifier from the NEF 130*g*. The application identifier may be used to indicate application detection filters to detect a specific service or an application. These filters may be configured as part of the SMF 130*b* or the PCC rule transmitted to the SMF.

The NWDAF 130*l* may receive the packet flow description (PFD) from the AF 130*i*. The NWDAF 130*l* may receive the PFD from the NEF 130*g*. The NWDAF 130*l* may receive the PFD from the SMF 130*b*. The PFD includes information for detecting traffic of a specific application or as service. A policy distribution function (PDF) corresponding to a specific application ID may be configured with information related to a PFD ID, an address and a port of a server, a part of URL, a domain name matching criterion, and an applicable protocol. The PFD may be stored in a UDR 130*h* by the AF 130*i* through the NEF 103*g*, and the PFD stored in the UDR may be utilized by the SMF 130*b*. The NWDAF 130*l* may collect an application identifier and information for detecting the same, by collecting the PFD.

The NWDAF 130*l* may receive the application data from the AF 130*i*. The NWDAF 130*l* may receive the application data from the UDR 130*h*. The NWDAF 130*l* may receive the application data from the NEF 130*g*. The application data may refer to information related to an application stored in the UDR 130*h*, and a request related to the PFD and AF influence traffic routing may be stored. The NWDAF 130*l* may collect a rule (PDF) for detecting a specific service or application by collecting this information. In addition, part of traffic classification information corresponding a specific service may be identified through a routing request made by the specific service.

The NWDAF 130*l* may receive the QoS rule from the SMF 130*b*. The NWDAF 130*l* may receive the QoS rule from the UE 120. The QoS rule may be used to classify the QoS flow in the UE 120, and may include a collection of packet filters. Since the packet filter is generated based on part of the SDF template, the NWDAF 130*l* may collect a flow matching rule by collecting a specific QoS flow matching rule.

The NWDAF 130*l* may receive the AF request from the AF 130*i*. The NWDAF 130*l* may receive the AF request from the NEF 130*g*. The NWDAF 130*l* may receive the AF request from the UDR 130*h*. The NWDAF 130*l* may receive the AF request from the PCF 130*d*. The AF 130*i* may transmit a request for applying a specific routing rule to specific traffic (AF request on traffic routing). The AF request may be stored in the UDR 130*h* through the NEF 130*g*, and a request stored in the UDR may be used by the PCF 130*d*. The AF request includes target UE, a transmission position (DN access identifier (DNAI)), a detection method. Through this, information related to UE using a specific service, a service detection method, and a service position may be obtained. Additionally, information related to tunneling may be additionally acquired through N6 traffic information collection.

The NWDAF 130*l* may receive the packet detection rule (PDR) from the SMF 130*b*. The NWDAF 130*l* may receive the PDR from the UPF 130*c*. The PDR is a rule for detecting specific user data traffic on a data plane, and may be configured with an IP packet filter and an Ethernet packet filter. Specific data traffic may not be mapped on a specific service by 1:1, but is based on the SDF and thus may be used to detect a specific service.

The NWDAF 130*l* may receive the traffic report from the UPF 130*c*. The NWDAF 130*l* may receive the traffic report from the SMF 130*b*. The SMF 130*b* may request the UPF 130*c* to report a traffic usage in order to control charging or traffic. In this case, the traffic report may include a report related to a PDU session or a traffic flow. Filter information corresponding to the traffic flow may be provided by the SMF 130*b*, and may be induced by utilizing a part of the PCC rule. The NWDAF 130*l* may collect information related to the rule for detecting a traffic flow and a traffic usage through the filter information.

The NWDAF 130*l* may acquire a method for detecting a specific service or an application through collected information, and the service may be expressed specifically by a combination of a specific application and information of a position where the application is provided. According to an embodiment of the disclosure, even a service providing the same application may be distinguished as a separate service according to a position and a service provider. Accordingly, the service may be expressed by using both an application identifier and an application position. In this case, the position of the application may be expressed by an AF ID, a network address, a network URL, etc.

The NWDAF 130*l* may allocate an application identifier by service in order to identify a specific service, besides the method of using the identifier of the application and the position information all together. For the same application, different application IDs may be allocated according to a service provider or a position. According to an embodiment of the disclosure, when the same application A is provided by different providers, the services may be distinguished through separate application identifiers like A1 and A2.

In order to analyze and forecast a demand for a specific service, the NWDAF 130*l* may receive previous service providing information and corresponding traffic information. An entity that collects traffic information may be the UPF 130*c*, and the UPF may report usage information of each traffic to the SMF 130*b* which requests a report of traffic usage information. The NWDAF 130*l* may directly receive a report of traffic usage information from the UPF 130*c*, or may collect traffic usage information through the SMF 130*b*. By utilizing the traffic report information, the NWDAF 130*l* may collect usage information of each service and the number of pieces of UE using a specific service in a whole core network, the number of PDU sessions, the number of service flows, a traffic volume according to a time slot. The NWDAF 130*l* may collect traffic of a specific service occurring in a specific terminal or a specific region, based on position information of a terminal or information of a position where traffic occurs, from the AMF or the SMF, according to a providing format of analysis information.

In the disclosure, the method for collecting traffic by service may be based on a report that is generated based on information collected in the UPF 130*c*, but embodiments of the disclosure are not limited thereto. For example, a function for the UPF 130*c* to directly monitor traffic by service and to report may be provided through an independent interface. In addition, for example, functions of the UPF 130*c* may be performed in the same way through a certain traffic collection device on a user data path inside a core network and a device reporting the same, devices collecting user data on an external network.

Figure 6:
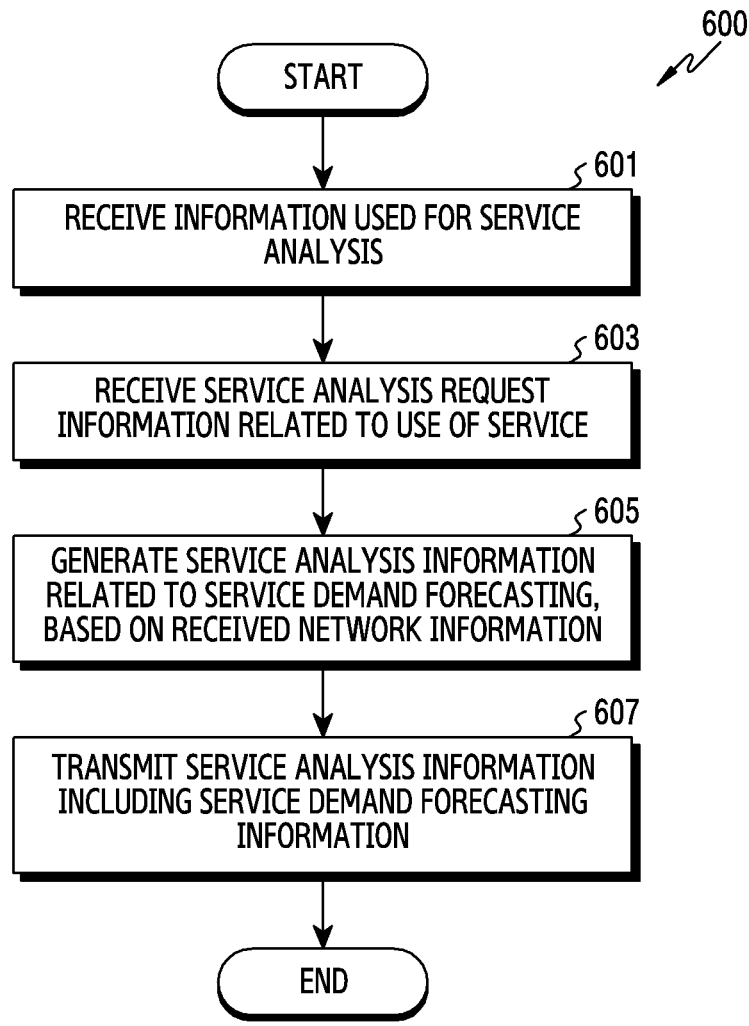
FIG. 6 is a flowchart illustrating an operating method of a network data analytics function (NWDAF) in a wireless communication system according to various embodiments of the disclosure.

FIG. 6 illustrates a flowchart 600 of an operating method of a network data analytics function (NWDAF) in a wireless communication system according to various embodiments of the disclosure. FIG. 6 illustrates an operating process of the NWDAF which is an entity including the configuration of FIG. 3.

Referring to FIG. 6, at step 601, the NWDAF 130*l* receives information used for service analysis. The NWDAF 130*l* receives network information related to use of a service. The information related to use of the service may include subscription information, mobility information, routing policy information, session modification event information, a traffic report, application information.

The subscription information indicates information for correlation of a specific terminal with other information. The mobility information indicates information regarding a position of a terminal at a specific time. The routing policy information indicates information to be used for a terminal at a specific position. The session modification event information indicates information for predicting a pattern of a session which uses an application. The traffic report indicates information for understanding a traffic pattern of an application. The application information indicates information for traffic correlation.

According to an embodiment of the disclosure, information received by the NWDAF may include a service data flow (SDF) description, a policy and charging control (PCC) rule, a service parameter, an application identifier, a packet flow description, application data, a QoS rule, an AF request, a packet detection rule (PDR), a traffic report.

At step 603, the NWDAF 130*l* receives service analysis request information related to use of the service. The service analysis request information specifies an analysis information type as service analysis information. In the disclosure, the name of "service usage" is used, but the name may be changed by a provider or developer. The request related to service analysis information requests an identifier of a targeted service as an analysis target. The service identifier may be expressed by a combination of an application identifier, a network address, an OSappID. The service analysis request information may include at least one piece of filter information for classifying by terminal, terminal group, region, specific data network name (DNN), specific DN access identifier (DNAI), slice, time.

At step 605, the NWDAF 130 generates service analysis information related to service demand forecasting, based on received network information.

The NWDAF 130*l* analyzes a previous service usage and a current service usage of a specific service, based on the received information. The NWDAF 130*l* analyzes information related to the use of the service by learning a previous pattern by applying a method used in the field of artificial intelligence (AI) or machine learning, or by applying a similar service pattern. The analyzed information may include a service traffic usage, the number of service users, the number of service packets, the number of service flows, a traffic pattern (relationship between UL data and DL data), an average traffic volume, a minimum bandwidth, the presence/absence of bursty traffic, an average delay time, a minimum delay time, an average flow maintaining time, an average flow size, a using period, the presence/absence of periodicity, the presence/absence of ON/OFF pattern (whether traffic of a predetermined time occurs after traffic of a specific time occurs). A parameter used to identify a specific service may be expressed by a combination of an application identifier, a network address, an operating system specific application identifier (OSappID). The analyzed information may be provided, classified by terminal using the service, terminal group, region, specific DNN, specific DNAI, slice, time by applying a filter. The filter may apply a condition regarding a case where a specific condition is satisfied. The specific condition may include information regarding a specific time or time interval, a threshold of a specific analysis value.

At step 607, the NWDAF 130*l* transmits the service analysis information including the service demand forecasting information.

The service analysis information includes analysis information for each terminal and analysis information for each application, complex analysis information, and expected service usage information. The analysis information for each terminal may include at least one of a terminal identifier, a general public subscription identifier (GPSI), a DNN, a DNAI, information on an expected residual time, information on an expected traffic volume. The analysis information for each application may include at least one of an application identifier, a DNN, a DNAI, information on an expected residual time, information on an expected traffic volume. The expected service usage information may include at least one of pieces of information on an expected traffic volume, the expected number of sessions, the expected number of users, the expected number of packets.

The analysis information may be provided to NFs constituting a mobile communication system or may be provided to an AF 130*i* positioned outside through an NEF 130*g*. The NWDAF 130*l* may provide analysis information without passing through the NEF if the AF 130*i* is reliable, and may provide analysis information to the NEF if the AF is not reliable. The NWDAF 130*l* may provide service analysis information regarding service expectation, based on analyzed previous or current information. A value of analysis information expected at a specific future time is provided, so that information regarding an increase or reduction of each analysis value may be provided. In this case, the specific future time may refer to a specific time, and the analysis information may include an analysis value regarding a specific future time slot.

FIG. 6 illustrates that the NWDAF receives the service analysis request information after receiving the information used for service analysis, but the NWDAF may receive the information used for service analysis after receiving the service analysis request information.

Figure 7:
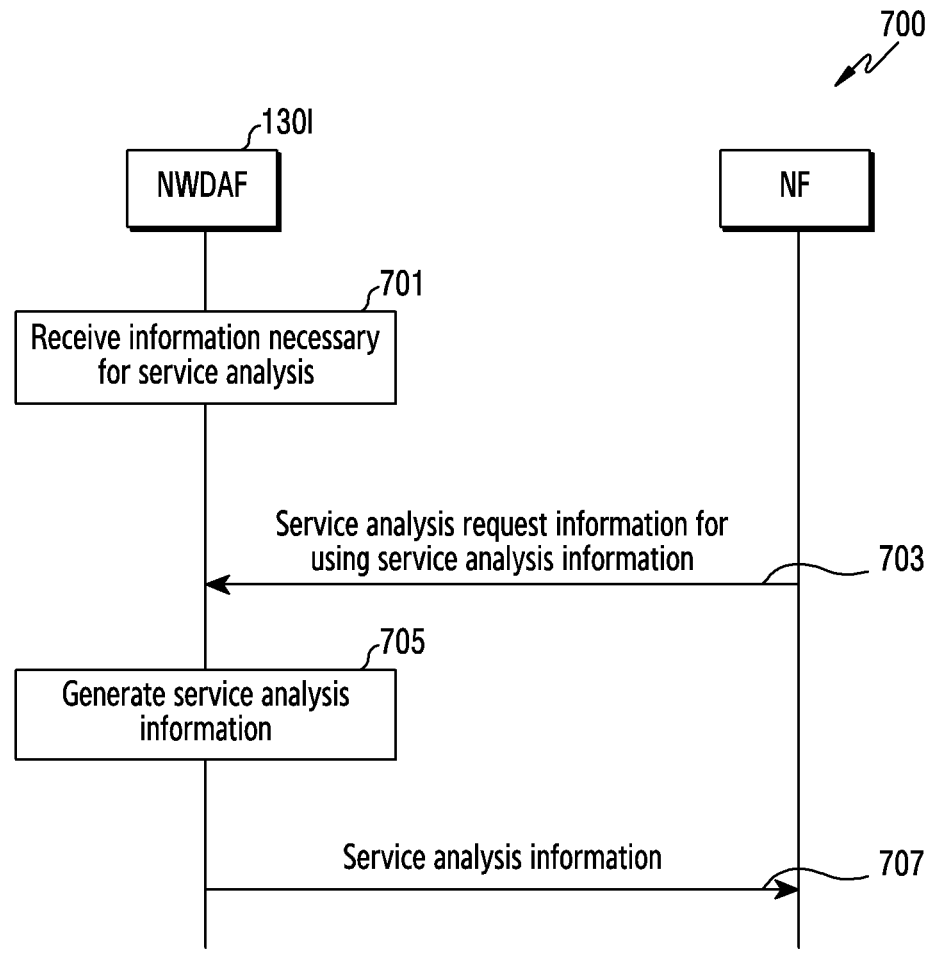
FIG. 7 is a view illustrating a process in which an NWDAF provides service analysis information to a network function (NF) positioned inside a core network in a wireless communication system according to various embodiments of the disclosure.

FIG. 7 illustrates a process 700 in which an NWDAF provides service analysis information to a network function (NF) positioned within a core network in a wireless communication system according to various embodiments of the disclosure.

At step 701, the NWDAF 130*l* receives information necessary for service analysis. The information necessary for service analysis may refer to information that is used by the NWDAF for forecasting a service demand for a service provider. According to an embodiment of the disclosure, the information necessary for service analysis may include at least one of subscriber information, mobility information, a routing policy, a session modification event, a traffic report, application information.

The subscriber information indicates information for correlation of a specific terminal with other information. The mobility information indicates information regarding a position of a terminal at a specific time. The routing policy information indicates information to be used for a terminal at a specific position. The session modification event information indicates information for predicting a pattern of a session which uses an application. The traffic report indicates information for understanding a traffic pattern of an application. The application information indicates information for traffic correlation.

At step 703, the NF transmits service analysis request information for using service analysis information to the NWDAF. According to an embodiment, the NF transmits a subscription request or a temporary request to the NWDAF. The service analysis request information specifies an analysis information type as service analysis information. In the disclosure, the name of "service usage" is used, but the name may be changed by a provider or developer. The request related to service analysis information requests an identifier of a targeted service as an analysis target. According to information (Nnwdaf_analyticexposure_subscribe/request) transmitted by the NF, an analytic ID may include service usage, a target may include an application identifier, a filter may include at least one of GPSI, area of interest, S-NSSAI. The service identifier may be expressed by a combination of an application identifier, a network address, an OSappID. The service analysis request information may include at least one piece of filter information for classifying by terminal, terminal group, region, specific DNN, specific DNAI, slice, time.

At step 705, the NWDAF 130*l* generates service analysis information. The NWDAF 130*l* generates service analysis information for use of service analysis information according to the received analysis request. According to an embodiment of the disclosure, the NWDAF 130*l* analyzes information related to use of a service by learning a previous pattern by applying a method used in the field of artificial intelligence (AI) or machine learning, or by applying a similar service pattern. The analyzed information may include a service traffic usage, the number of service users, the number of service packets, the number of service flows, a traffic pattern (relationship between UL data and DL data), an average traffic volume, a minimum bandwidth, the presence/absence of bursty traffic, an average delay time, a minimum delay time, an average flow maintaining time, an average flow size, a using period, the presence/absence of periodicity, the presence/absence of ON/OFF pattern (whether traffic of a predetermined time occurs after traffic of a specific time occurs).

At step 707, the NWDAF 130*l* transmits the service analysis information to the NF. When the analysis information is not expressed by one piece of analysis information according to a service analysis request filter, the NWDAF 130*l* may generate a plurality of responses and may transmit the same. The information (Nnwdaf_analyticexposure_notify/response) transmitted by the NWADF 130*l* may include at least one of an appID, a DNN, a DNAI, an expected residual time, an expected traffic volume.

The NWDAF 130*l* generates service analysis information based on service analysis request information received from an NEF, and transmits the service analysis information to the NEF. The service analysis information includes analysis information for each terminal and analysis information for each application, complex analysis information, and expected service usage information.

The analysis information for each terminal may include at least one of a terminal identifier, a GPSI, a DNN, a DNAI, information on an expected residual time, information on an expected traffic volume. The analysis information for each application may include at least one of an application identifier, a DNN, a DNAI, information on an expected residual time, information on an expected traffic volume. The expected service usage information may include at least one of pieces of information on an expected traffic volume, the expected number of sessions, the expected number of users, the expected number of packets.

FIG. 7 illustrates that the service analysis request information is received after the information necessary for service analysis is received, but this is merely an example, and the information necessary for service analysis may be received after the service analysis request information is received.

Figure 8:
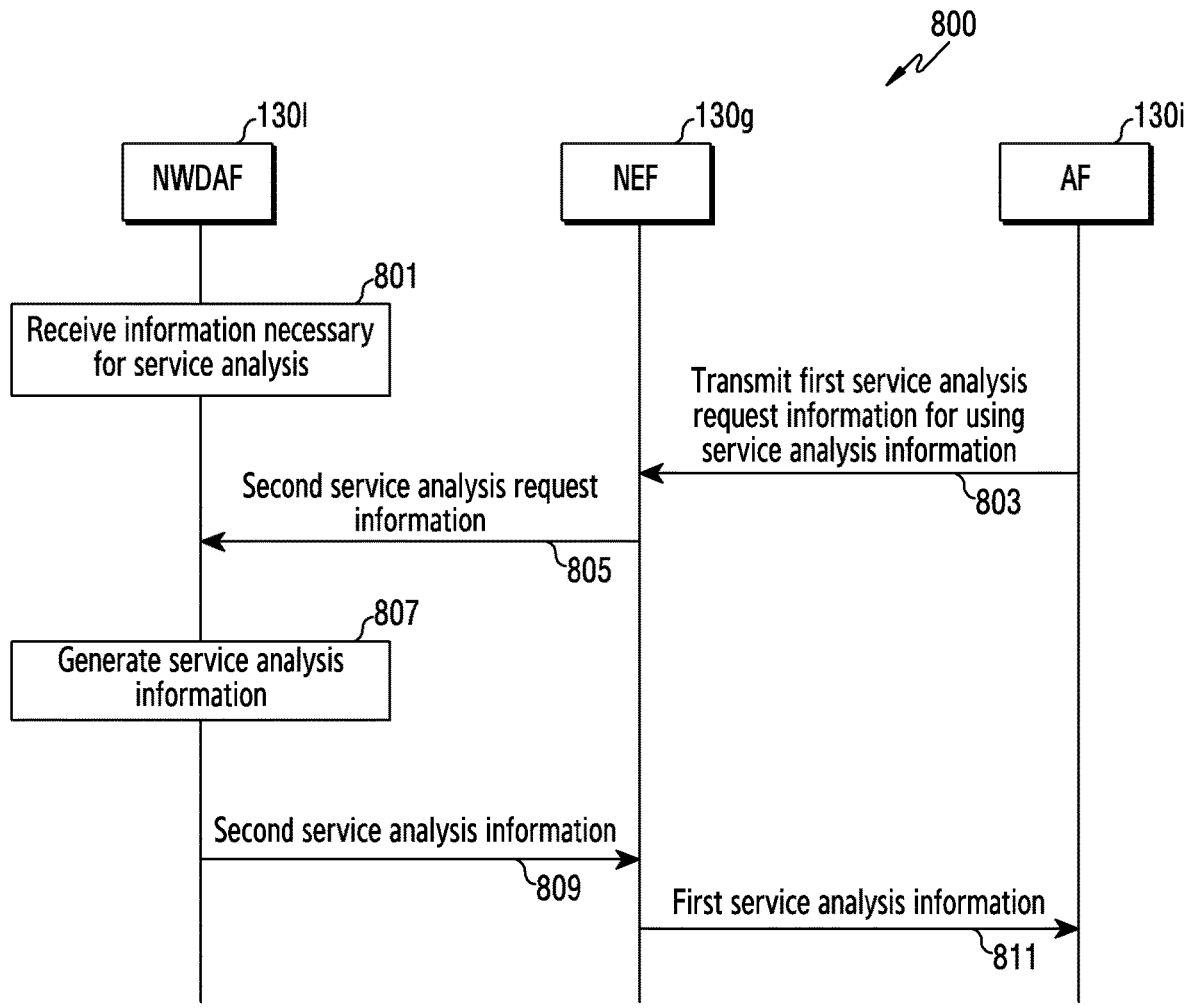
FIG. 8 is a view illustrating a process in which an NWDAF provides service analysis information to an application function (AF) through an NEF in a wireless communication system according to various embodiments of the disclosure.

FIG. 8 illustrates a process 800 in which an NWDAF provides service analysis information to an application function (AF) through an NEF in a wireless communication system according to various embodiments of the disclosure. The NWDAF 130*l* may use the NEF to provide service analysis information to the AF positioned outside a network, not to an NF. The NEF 130*g* may mediate a message between the AF and the NWDAF.

Referring to FIG. 8, at step 801, the NWDAF 130*l* receives information necessary for service analysis. The information necessary for service analysis may refer to information that is used by the NWDAF for forecasting a service demand for a service provider. According to an embodiment of the disclosure, the information necessary for service analysis may include at least one of subscriber information, mobility information, a routing policy, a session modification event, a traffic report, application information.

The subscriber information indicates information for correlation of a specific terminal with other information. The mobility information indicates information regarding a position of a terminal at a specific time. The routing policy information indicates information to be used for a terminal at a specific position. The session modification event information indicates information for predicting a pattern of a session which uses an application. The traffic report indicates information for understanding a traffic pattern of an application. The application information indicates information for traffic correlation.

At step 803, the AF 130*i* transmits first service request information for using service analysis information to the NEF. A type of analysis information of the first service request information may be specified as service usage, and an interface for external exposure provided by the NEF is used to generate second service analysis request information for transmitting to the NWDAF. The NEF 130*g* generates the second service analysis request information by converting terminal identifier external information into information to be used inside. According to information (Nnef_analyticexposure_subscribe/request) transmitted by the AF, an analyticID may include expected service usage, a target may include an application identifier, and a filter may include at least one of GPSI, area of interest, S-NSSAI.

At step 805, the NEF 130*g* transmits the second service request information to the NWDAF. A type of analysis information of the second service request information may be specified as service analysis information. The request related to analysis information requests an identifier of a targeted service as an analysis target. The service identifier may be expressed by a combination of an application identifier, a network address, an OSappID. Information received by the NWDAF may be referred to as (Nnwdaf_analyticexposure_subscribe/request), and may include at least one piece of filter information for classifying by terminal, terminal group, region, specific DNN, specific DNAI, slice, time.

At step 807, the NWDAF 130*l* generates second service analysis information according to the second service analysis request information, and at step 809, the NWDAF 130*l* transmits the generated second service analysis information to the NEF. The NEF 130g generates first service analysis information by converting information used inside into information exposable to the outside in order to generate the first service analysis information to transmit to the AF. Information (Nnwdaf_analyticexposure_notify/response) transmitted by the NWDAF 1031 may include at least one of an AppID, a DNN, an expected residual time, an expected traffic volume.

At step 811, the NEF 130g transmits the first service analysis information to the AF. Information transmitted by the NEF 130g may be expressed by Nnwdaf_analyticexposure_notify/response.

FIG. 8 illustrates that the service analysis request information is received after the information necessary for service analysis is received, but this is merely an example, and the information necessary for service analysis may be received after the service analysis request information is received.

The request related to the first service analysis information, transmitted by the AF, requests an identifier of a targeted service as an analysis target. The service identifier may be expressed by a combination of an application identifier, a network address, an OSappID. The service analysis request information may include at least one piece of filter information for classifying by terminal, terminal group, region, specific DNN, specific DNAI, slice, time.

Since the AF 130i may use an identifier used outside, in addition to identifiers used within a network, the NEF 130g transmits the second service analysis request information for transmitting to the NWDAF. According to an embodiment of the disclosure, when the NEF 130g indicates a specific terminal for the NWDAF, a UE ID or a subscription permanent identifier (SUPI) may not be used, and a general public subscription identifier (GPSI), an external identifier, a mobile station international subscriber directory number (MSISDN), etc. may be used. The NEF 130g performs a role of converting an external identifier used outside into an internal identifier. According to an embodiment of the disclosure, when the AF 130i makes a request for position information by including general position information such as longitude, latitude of a specific region, the NEF 130g may convert the position information into information for internal position management such as a cell ID. When a plurality of NWDAFs are distributed, the NEF 130g may transmit the request to an NWDAF that provides analysis information by service.

Network information related to service usage, which is received by the NWDAF, may include subscription information, mobility information, routing policy information, session modification event information, a traffic report, application information.

The NWDAF 130l generates the second service analysis information based on the second service analysis request information received from the NEF, and transmits the second service analysis information to the NEF. According to an embodiment of the disclosure, the second service analysis information includes analysis information for each terminal and analysis information for each application, complex analysis information, and expected service usage information.

The analysis information for each terminal may include at least one of a terminal identifier, a GPSI, a DNN, a DNAI, information on an expected residual time, information on an expected traffic volume. The analysis information for each application may include at least one of an application identifier, a DNN, a DNAI, information on an expected residual time, information on an expected traffic volume. The expected service usage information may include at least one of pieces of information on an expected traffic volume, the expected number of sessions, the expected number of users, the expected number of packets.

The NEF 130g transmits, to the AF, the first service analysis information which is generated by converting the internal identifier in the second service analysis information received from the NWDAF into an identifier exposable to the outside.

Figure 9:
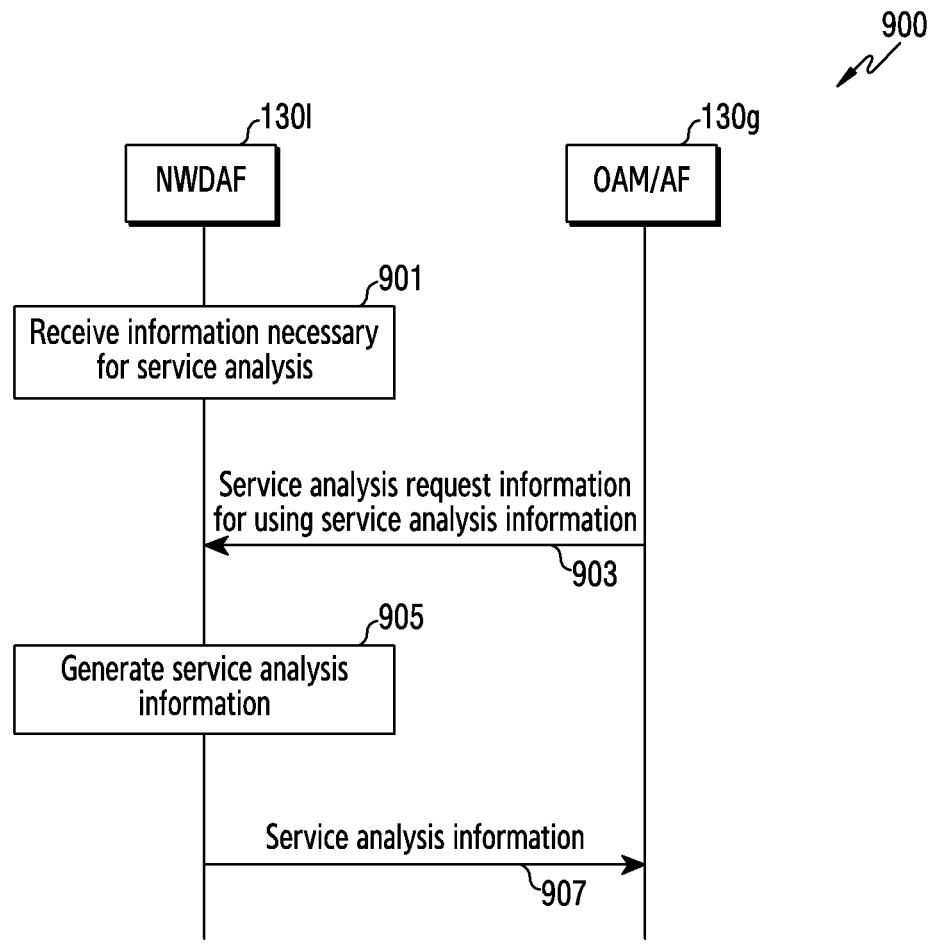
FIG. 9 is a view illustrating a process in which an NWDAF provides service analysis information to a reliable AF in a wireless communication system according to various embodiments of the disclosure.

FIG. 9 illustrates a process 900 in which an NWDAF provides service analysis information to a reliable AF in a wireless communication system according to various embodiments of the disclosure. Analysis information predicted by the NWDAF by collecting and analyzing data may be transmitted to OAM which manages a mobile communication system or an entity which manages a specific application. In this case, an interface used for transmitting the analysis information is not limited to use of a standardized interface of the NWDAF.

Referring to FIG. 9, at step 901, the NWDAF 130l receives information necessary for service analysis. The information necessary for service analysis may refer to information that is used by the NWDAF for forecasting a service demand for a service provider. According to an embodiment of the disclosure, the information necessary for service analysis may include at least one of subscriber information, mobility information, a routing policy, a session modification event, a traffic report, application information.

The subscriber information indicates information for correlation of a specific terminal with other information. The mobility information indicates information regarding a position of a terminal at a specific time. The routing policy information indicates information to be used for a terminal at a specific position. The session modification event information indicates information for predicting a pattern of a session which uses an application. The traffic report indicates information for understanding a traffic pattern of an application. The application information indicates information for traffic correlation.

At step 903, the OAM or AF 130i transmits a subscription request or a temporary request to the NWDAF in order to use service analysis information. The request information specifies an analysis information type as service analysis information. In the disclosure, the name of "service usage" is used, but the name may be changed by a provider or developer. In addition, the request related to analysis information requests an identifier of a targeted service as an analysis target. As described above, the service identifier may be expressed by a combination of an application identifier, a network address, an OSappID. The request may additionally include at least one piece of filter information for classifying by terminal, terminal group, region, specific DNN, specific DNAI, slice, time. According to information (Nnwdaf_analyticexposure_subscribe/request) transmitted by the OAM or AF 130i, an analytic ID may include service usage, a target may include an application identifier, a filter may include at least one of GPSI, area of interest, S-NSSAI.

At step 905, the NWDAF 130l generates service analysis information according to the service analysis request information received from the OAM or the AF, and, at step 907, the NWDAF 130l transmits the generated service analysis information to the OAM or AF which requests service analysis. The information (Nnwdaf_analyticexposure_notify/response) transmitted by the NWADF 130l may include at least one of an appID, a DNN, a DNAI, an expected residual time, an expected traffic volume. The service analysis information that the NWDAF transmits to the OAM or AF includes analysis information for each terminal and analysis information for each application, complex analysis information, and expected service usage information.

The analysis information for each terminal may include at least one of a terminal identifier, a GPSI, a DNN, a DNAI, information on an expected residual time, information on an expected traffic volume. The analysis information for each application may include at least one of an application identifier, a DNN, a DNAI, information on an expected residual time, information on an expected traffic volume. The expected service usage information may include at least one of pieces of information on an expected traffic volume, the expected number of sessions, the expected number of users, the expected number of packets.

FIG. 9 illustrates that the service analysis request information is received after the information necessary for service analysis is received, but this is merely an example, and the information necessary for service analysis may be received after the service analysis request information is received.

Figure 10:
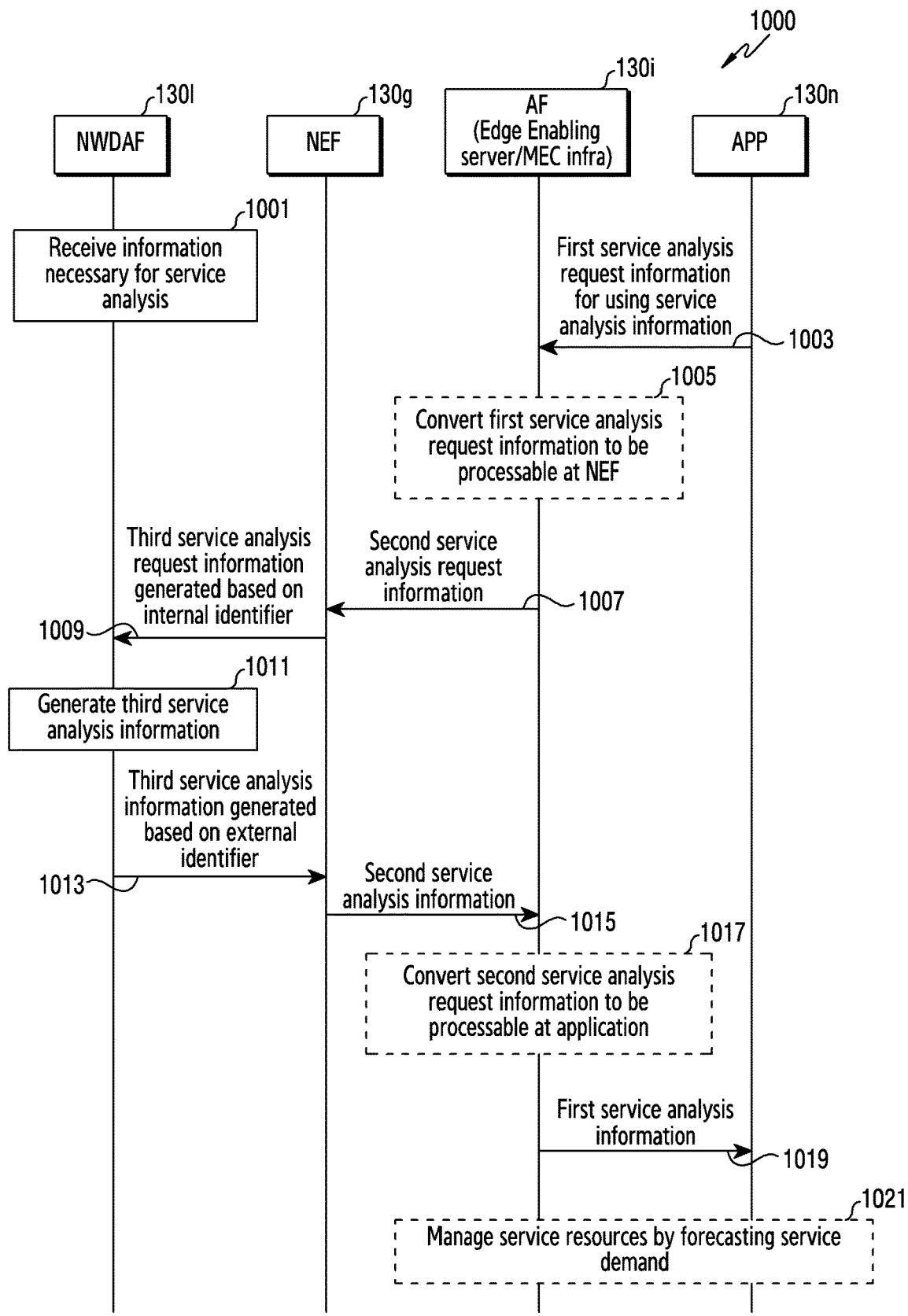
FIG. 10 is a view illustrating a process in which a service provider provides service-related analysis information through an intermediate entity in a wireless communication system according to various embodiments of the disclosure.

FIG. 10 illustrates a process 1000 in which a service provider provides service-related analysis information through an intermediate entity in a wireless communication system according to various embodiments of the disclosure.

When a specific service provider rents a specific resource such as a cloud environment or MEC and provides a service, the service provider and a resource management entity may be different. When a service operated by the service provider does not perform a role as an AF, the resource management entity transmits network analysis information by communicating with a mobile communication network instead. FIG. 10 includes a method for a service provider to acquire service analysis information when the service provider of a specific application which is operated in a terminal, and a server resource management entity providing a service from the outside are different.

Referring to FIG. 10, at step 1001, an NWDAF 130*l* receives information necessary for service analysis.

The information necessary for service analysis may refer to information that is used by the NWDAF for forecasting a service demand for the service provider. According to an embodiment of the disclosure, the information necessary for service analysis may include at least one of subscriber information, mobility information, a routing policy, a session modification event, a traffic report, application information.

The subscriber information indicates information for correlation of a specific terminal with other information. The mobility information indicates information regarding a position of a terminal at a specific time. The routing policy information indicates information to be used for a terminal at a specific position. The session modification event information indicates information for predicting a pattern of a session which uses an application. The traffic report indicates information for understanding a traffic pattern of an application. The application information indicates information for traffic correlation.

At step 1003, an application (App) 130*n* transmits first service analysis request information on a specific application to an AF, by using a request of a platform provided in a cloud or MEC. The AF 130*i* may include an MEC or cloud platform, and identifiers used in the first service analysis request information may be separately determined between the service provider and a platform provider. Information (request_service_demand) transmitted by the App 130*n* may include information on an external UE ID, an appID, a target, a filter.

At step 1005, the AF 130*i* converts the first service analysis request information to be processable by an NEF. The AF 130*i* generates second service analysis request information based on an identifier used in a mobile communication network. According to an embodiment of the disclosure, an identifier of UE may be allocated and used in a service, but the first service analysis request information should be converted into an identifier processable at the NEF in order to request service analysis information from the NWDAF. Accordingly, an internal UE identifier may be converted into an identifier such as a GPSI or an external ID. In the same way, in the case of an application identifier, an identifier internally allocated in the application or service may be converted into a combination of the application identifier, network address, OSappID described above. The request may additionally include at least one piece of filter information for classifying by terminal, terminal group, region, specific DNN, specific DNAI, slice, time.

At step 1007, the AF 130*i* transmits second service analysis request information. The request is requested to the NEF by using a standard interface. A type of analysis information may be specified as "service usage." According to information (Nnef_analyticexposure_subscribe/request) transmitted by the AF 130*i*, an analyticID may include service usage, a target may include an application identifier, and a filter may include at least one of GPSI, area of interest, S-NSSAI.

The NEF 130*g* generates third service analysis request information by converting terminal identifier external information into information to be used inside.

At step 1009, the NEF 130*g* transmits the third service analysis request information (Nnwdaf_analyticexposure-_subscribe/request) generated based on the internal identifier to the NWDAF. A type of analysis information related to the third service analysis request information is specified as service analysis information. In the disclosure, the name of "service usage" is used, but the name may be changed by a provider or developer. The request related to analysis information requests an identifier of a targeted service as an analysis target. The service identifier may be expressed by a combination of an application identifier, a network address, an OSappID. The third service analysis request information received by the NWDAF may include at least one piece of filter information for classifying by terminal, terminal group, region, specific DNN, specific DNAI, slice, time.

At step 1011, the NWDAF 130*l* generates third service analysis information according to the third service analysis request information.

At step 1013, the NWDAF 130*l* transmits the generated third service analysis information to the NEF. The NWDAF 130*l* generates the third service analysis information based on the third service analysis request information received from the NEF, and transmits the same to the NEF. The third service analysis information may be expressed by Nnwdaf_analyticexposure_notify/response), and may include a list of service usage analytics. According to an embodiment of the disclosure, the third service analysis information includes analysis information for each terminal and analysis information for each application, complex analysis information, and expected service usage information.

The analysis information for each terminal may include at least one of a terminal identifier, a GPSI, a DNN, a DNAI, information on an expected residual time, information on an expected traffic volume. The analysis information for each application may include at least one of an application identifier, a DNN, a DNAI, information on an expected residual time, information on an expected traffic volume. The expected service usage information may include at least one of pieces of information on an expected traffic volume, the expected number of sessions, the expected number of users, the expected number of packets.

The NEF 130*g* which receives the third service analysis information may generate second service analysis information by converting an identifier used inside into information exposable to the outside, in order to generate the second service analysis information to transmit to the AF.

At step 1015, the NEF 130*g* transmits the second service analysis information (Nnef_analyticexposure_notify/response) to the AF.

At step 1017, the AF 130*i* converts the second service analysis information to be processable at the application. The AF 130*i* changes identifiers used in mobile communication into identifier to be used by the application or service as opposed to the operation at step 1005. The AF 130*i* generates first service analysis information by changing the identifier.

At step 1019, the AF 130*i* transmits the first service analysis information to the application 130*n*. The first service analysis information may be expressed by reponse_service_demand, and may include service usage analytics information.

At step 1021, the App 130*n* receiving the first service analysis information or the AF 130*i* receiving the second service analysis information manages resources. A resource managing method may include at least one of scaling of resources, provisioning of resources, or migration of service data from a first MEC service region of resources to a second MEC service region.

FIG. 10 illustrates that the service analysis request information is received after the information necessary for service analysis is received, but this is merely an example, and the information necessary for service analysis may be received after the service analysis request information is received.

Figure 11:
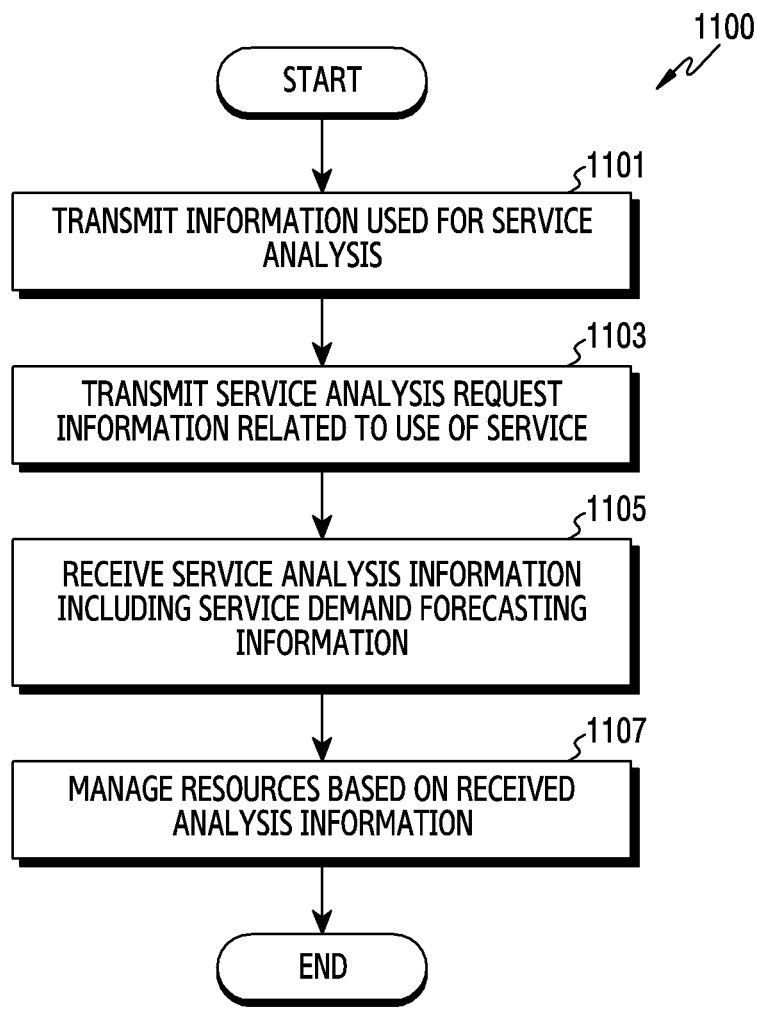
FIG. 11 is a flowchart illustrating an operating method of a service provider in a wireless communication system according to various embodiments of the disclosure.

FIG. 11 illustrates a flowchart 1100 of an operating method of a service provider in a wireless communication system according to various embodiments of the disclosure. FIG. 11 illustrates an operating method of a service provider. The service provider may include an App 130*n* or an AF 130*i*.

Referring to FIG. 11, at step 1101, the service provider transmits information used for service analysis. The service provider may indicate an object including an application or an AF and providing a service for allocating resources. According to an embodiment of the disclosure, the AF 130*i* may transmit at least one of an AF request, application data, a PFD, an application identifier, a service parameter, an SDF description.

At step 1103, the service provider transmits service analysis request information related to service usage. A request related to first service analysis information, which is transmitted by the AF, requests an identifier of a targeted service as an analysis target. The service identifier may be expressed by a combination of an application identifier, a network address, an OSappID. The service analysis request information may include at least one piece of filter information for classifying by terminal, terminal group, region, specific DNN, specific DNAI, slice, time.

According to an embodiment of the disclosure, the AF 130*i* transmits the service analysis request information to an NEF. According to another embodiment of the disclosure, the AF 130*i* transmits a subscription request or a temporary request for using service analysis information to an NWDAF when the NWDAF is a reliable service provider.

At step 1105, the service provider receives service analysis information including service demand forecasting information. According to an embodiment of the disclosure, the AF 130*i* may receive converted service analysis information from the NEF, or, when the AF is a reliable service provider, the AF may directly receive service analysis information from the NWDAF.

At step 1107, the service provider may manage resources based on the received analysis information. The service provider which receives the service analysis information including service demand forecasting information may manage resources according to expected service analysis information.

Since an amount of necessary resources changes according to a service demand, a service provider may control to optimize unused resources which are allocated to a specific application or to allocate minimum resources necessary for providing a current service, through flexible resource management. A service demand may be forecasted based on service analysis information, and a service provider may reduce an amount of allocated resources when it is expected that the demand is reduced. On the other hand, when it is expected that the demand increases, the service provider may be allocated more resources and may adjust to smoothly provide the service.

When it is expected that a request for a specific service occurs in a new region due to mobility of a terminal, the service provider may transmit a context and storage information necessary for providing the service to a server or an MEC supporting a specific position in advance, so that a waiting time necessary for providing an initial service may be reduced. By utilizing service usage analysis information of specific UE, the specific UE migrates or copies a service context or a virtual image, etc. of a specific terminal in advance by using analysis information regarding a request for a service in a specific region, so that a delay time necessary for providing the service may be reduced.

Methods based on the claims or the embodiments disclosed in the disclosure may be implemented in hardware, software, or a combination of both.

When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the claims or the embodiments disclosed in the disclosure.

The program (the software module or software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may access via an external port to a device which performs the embodiments of the disclosure. In addition, an additional storage device on a communication network may access to a device which performs the embodiments of the disclosure.

In the above-described specific embodiments of the disclosure, elements included in the disclosure are expressed in singular or plural forms according to specific embodiments. However, singular or plural forms are appropriately selected according to suggested situations for convenience of explanation, and the disclosure is not limited to a single element or plural elements. An element which is expressed in a plural form may be configured in a singular form or an element which is expressed in a singular form may be configured in plural number.

While specific embodiments have been described in the detailed descriptions of the disclosure, it will be understood by those skilled in the art that various changes may be made therein without departing from the spirit and scope of the disclosure. Therefore, the scope of the disclosure should be defined not by the described embodiments but by the appended claims or the equivalents to the claims.

The invention claimed is:

1. A method performed by a network data analytics function (NWDAF) entity in a wireless communication system, the method comprising:
obtaining information for service analysis including subscriber information, mobility information, a routing policy, a session modification event, a traffic report, and application information;
receiving, from a network exposure function (NEF) entity, a first message requesting a subscription for an analysis, wherein the first message indicates a type of the analysis as a service usage and comprises an application identifier for the analysis and filter information including an area of interest and slice information;
generating analytics information based on the first message and the obtained information, wherein the analytics information includes terminal specific analysis information, application specific analysis information, complex analysis information, and expected service usage information; and
transmitting, to the NEF entity, a second message as a response to the first message, the second message including the analytics information,
wherein the terminal specific analysis information comprises a terminal identifier, a general public subscription identifier, a data network name (DNN), a data network access identifier (DNAI), expected residual time information, and expected traffic volume information,
wherein the application specific analysis information comprises the application identifier, the DNN, the DNAI, the expected residual time information, and the expected traffic volume information, and
wherein the expected service usage information comprises the expected traffic volume information, an expected number of sessions, an expected number of users, and an expected number of packets.

2. The method of claim 1, wherein the terminal specific analysis information further includes location information to which a specific terminal or a terminal group is related.

3. The method of claim 1, wherein the analytics information is associated with a mobile edge computing (MEC) service.

4. A network data analytics function (NWDAF) entity in a wireless communication system, the NWDAF entity comprising:
a transceiver; and
a controller coupled with the transceiver and configured to:
obtain information for service analysis including subscriber information, mobility information, a routing policy, a session modification event, a traffic report, and application information,
receive, from a network exposure function (NEF) entity, a first message requesting a subscription for an analysis, wherein the first message indicates a type of the analysis as a service usage and comprises an application identifier for the analysis and filter information including an area of interest and slice information,
generate analytics information based on the first message and the obtained information, wherein the analytics information includes terminal specific analysis information, application specific analysis information, complex analysis information, and expected service usage information, and
transmit, to the NEF entity, a second message as a response to the first message, the second message including the analytics information,
wherein the terminal specific analysis information comprises a terminal identifier, a general public subscription identifier, a data network name (DNN), a data network access identifier (DNAI), expected residual time information, and expected traffic volume information,
wherein the application specific analysis information comprises the application identifier, the DNN, the DNAI, the expected residual time information, and the expected traffic volume information, and
wherein the expected service usage information comprises the expected traffic volume information, an expected number of sessions, an expected number of users, and an expected number of packets.

5. The NWDAF entity of claim 4, wherein the terminal specific analysis information further includes location information to which a specific terminal or a terminal group is related.

6. The NWDAF entity of claim 4, wherein the analytics information is associated with a mobile edge computing (MEC) service.

* * * * *